United States Patent
Rainville

(10) Patent No.: US 11,453,514 B2
(45) Date of Patent: Sep. 27, 2022

(54) AUTONOMOUS HYDROGEN REFUELING

(71) Applicant: Bell Helicopter Textron Inc., Fort Worth, TX (US)

(72) Inventor: Joseph Dean Rainville, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 420 days.

(21) Appl. No.: 16/214,765

(22) Filed: Dec. 10, 2018

(65) Prior Publication Data
US 2020/0180782 A1   Jun. 11, 2020

(51) Int. Cl.
*B64F 1/28* (2006.01)
*B64D 37/30* (2006.01)

(52) U.S. Cl.
CPC ............. *B64F 1/28* (2013.01); *B64D 37/30* (2013.01)

(58) Field of Classification Search
CPC ... B64F 1/28; B64F 1/36; B64D 37/30; B64D 37/10; B64D 37/14; B64D 37/16; B64D 37/18; B64D 39/00; B64D 39/04; B64D 39/06; B64D 37/00; F17C 6/00; C25B 15/08; G05D 1/00
See application file for complete search history.

(56) References Cited

U.S. PATENT DOCUMENTS

| | | | |
|---|---|---|---|
| 9,387,928 B1* | 7/2016 | Gentry | G08G 5/0052 |
| 2015/0123462 A1* | 5/2015 | Kamradt | B67D 7/78 307/9.1 |
| 2016/0376031 A1* | 12/2016 | Michalski | G05D 1/0669 701/15 |
| 2017/0050749 A1* | 2/2017 | Pilskalns | B60L 53/36 |
| 2017/0341769 A1* | 11/2017 | Haberbusch | B64C 39/024 |
| 2018/0196418 A1* | 7/2018 | Meier | B64C 39/024 |
| 2019/0077521 A1* | 3/2019 | Kelly | B64F 1/28 |
| 2019/0277448 A1* | 9/2019 | Krogsgaard | F17C 5/06 |
| 2020/0041072 A1* | 2/2020 | Werlen | F25B 9/008 |
| 2020/0132254 A1* | 4/2020 | Stephan | F17C 5/06 |
| 2020/0370708 A1* | 11/2020 | Kim | F17C 5/02 |

FOREIGN PATENT DOCUMENTS

| | | | | |
|---|---|---|---|---|
| WO | WO-2007059781 A1 * | 5/2007 | | B67D 7/38 |
| WO | WO-2019206483 A1 * | 10/2019 | | B64C 39/024 |

* cited by examiner

*Primary Examiner* — Joshua J Michener
*Assistant Examiner* — Cindi M Curry
(74) *Attorney, Agent, or Firm* — Lightfoot & Alford PLLC

(57) ABSTRACT

A system and a method for autonomous hydrogen refueling of vertical lift aircraft using a landing pad with sensors, a hydrogen storage tank, a refueling arm configured to couple the hydrogen storage tank to the aircraft and a controller configured to control a flow of fuel from the hydrogen storage tank to the aircraft.

17 Claims, 5 Drawing Sheets

AUTONOMOUS HYDROGEN REFUELING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Conventional aircraft are typically refilled by a mechanic manually adding fuel to the aircraft. To refuel a conventional aircraft a mechanic opens a port to a fuel tank of the aircraft, inserts a fuel nozzle into the port and starts the flow of fuel. The mechanic then removes the fuel nozzle once the fuel tank is refilled and closes the port. Inherently, conventional fueling systems hinder autonomous aircraft refueling because they require a person's intervention each instance the aircraft requires more fuel.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

For autonomous vehicles, such as drones and air taxis, to be efficient, they require a fuel source that can provide them fuel autonomously. Waiting for a mechanic to fuel a drone is inefficient. An autonomous fueling system enables drones to fly to a fuel source and refill their fuel tank without a human present at the site of refueling. Autonomous fueling systems can operate around the clock, without the need for a break, and in all weather conditions.

Figure 1:
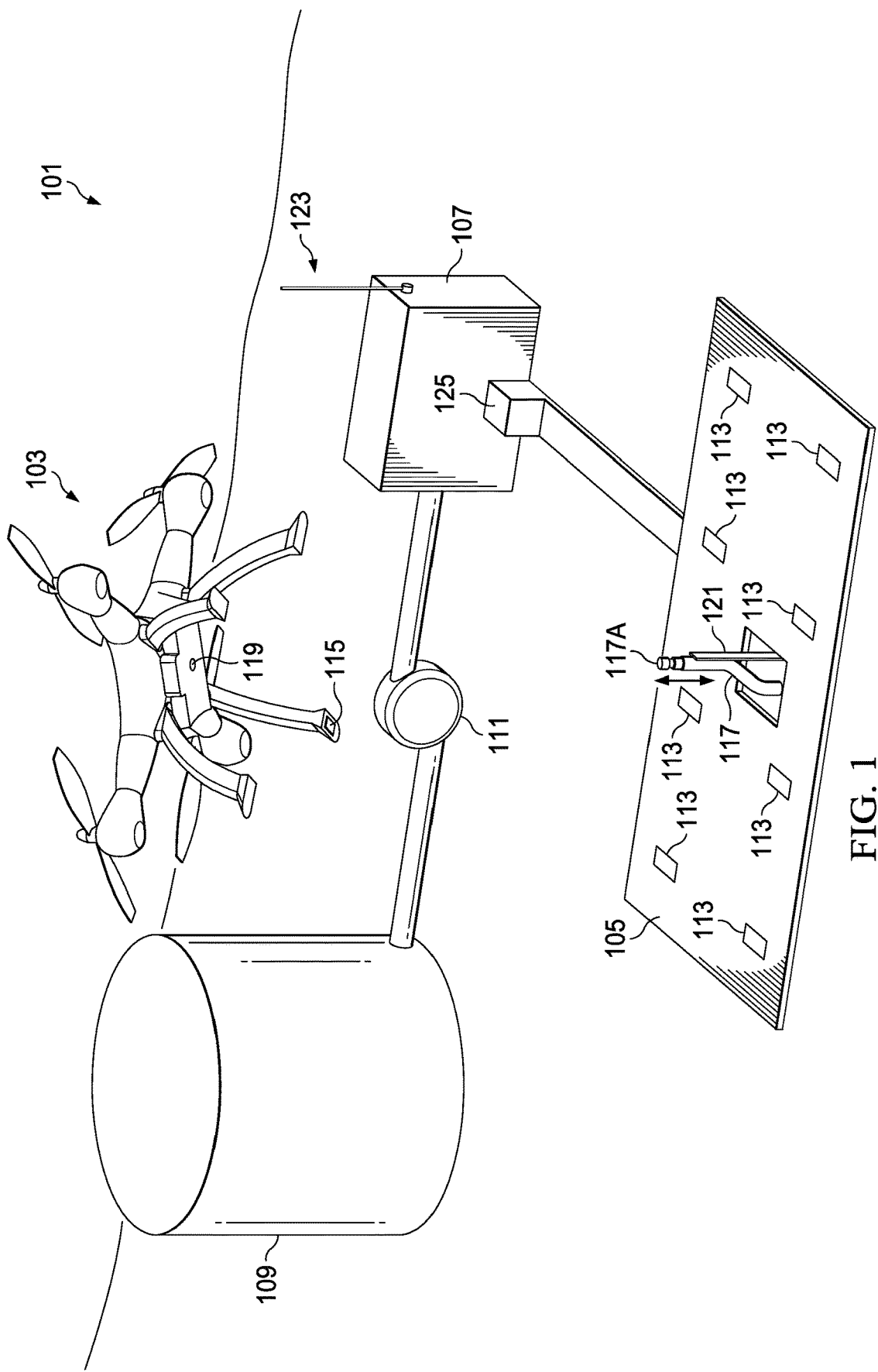
FIG. 1 is an oblique view of an autonomous hydrogen refueling system according to this disclosure.

FIG. 1 illustrates an autonomous hydrogen refueling system 101 according to this disclosure. The autonomous hydrogen refueling system 101 comprises an aircraft 103, a landing pad 105, a controller 107, a hydrogen storage tank 109, and a compressor 111. The aircraft 103 approaches the landing pad 105 and communicates to the controller 107 regarding refueling needs. While aircraft 103 is illustrated as a small drone, other autonomous vertical-lift aircraft are contemplated by this application. Aircrafts such as helicopters, air taxis, and tiltrotors are configurable to accept fuel from system 101.

A position of the aircraft 103 relative to the landing pad 105 is detected by fixed sensors 113 located on the landing pad 105 and airborne sensors 115 located on the aircraft 103. The sensors are a combination of proximity sensors and optical sensors and enable the aircraft 103 and the controller 107 to determine a location of the aircraft 103 relative to a refueling arm 117 and a nozzle 117A located on an end of the refueling arm 117. The positional data related to the aircraft 103 enables both the controller 107 and the aircraft 103 to collectively center a recessed receptacle 119 of the aircraft 103 over the refueling arm 117. Refueling arm 117 translates vertically in response to the controller 107 moving an actuator 121, thereby allowing the system 101 to adjust to aircraft of varying heights. Refueling arm 117 is limited to a single degree-of-freedom because the actuator 121 provides movement only along a single axis, alternatively additional actuators are contemplated to enable more control of the refueling arm 117. Aircraft 103 translates longitudinally, laterally, and vertically to position the aircraft 103 relative the refueling arm 117. Refueling arm 117 couples to the recessed receptacle 119 associated with an underside surface of aircraft 103. Other areas of the aircraft 103 are contemplated as locations for the recessed receptacle 119.

Hydrogen fuel from the hydrogen storage tank 109 is compressed by compressor 111 and regulated by controller 107 before it flows into aircraft 103 through refueling arm 117. Typically, hydrogen fuel is stored at 5,000 psi or 10,000 psi in the hydrogen storage tank 109. Compressor 111 increases the pressure of the hydrogen fuel as needed to refuel the aircraft 103. Preferably the hydrogen fuel located in the hydrogen storage tank 109 is in a gas state, although other states of hydrogen are contemplated by this application. For example, the hydrogen could be stored as a liquid or as a solid until converted into a gas form for fueling the aircraft 103.

Controller 107 is configured to communicate with the aircraft 103 via a wireless system 123. Data such as connection status, amount of hydrogen stored in the hydrogen storage tank, and/or amount of time spent filling the aircraft 103 is transmitted between the aircraft 103 and the controller 107. Controller 107 actuates valve 125 to allow hydrogen gas to refuel the aircraft 103. Controller 107 commands the actuator 121 to extend and retract the refueling arm 117 as needed.

Figure 2:
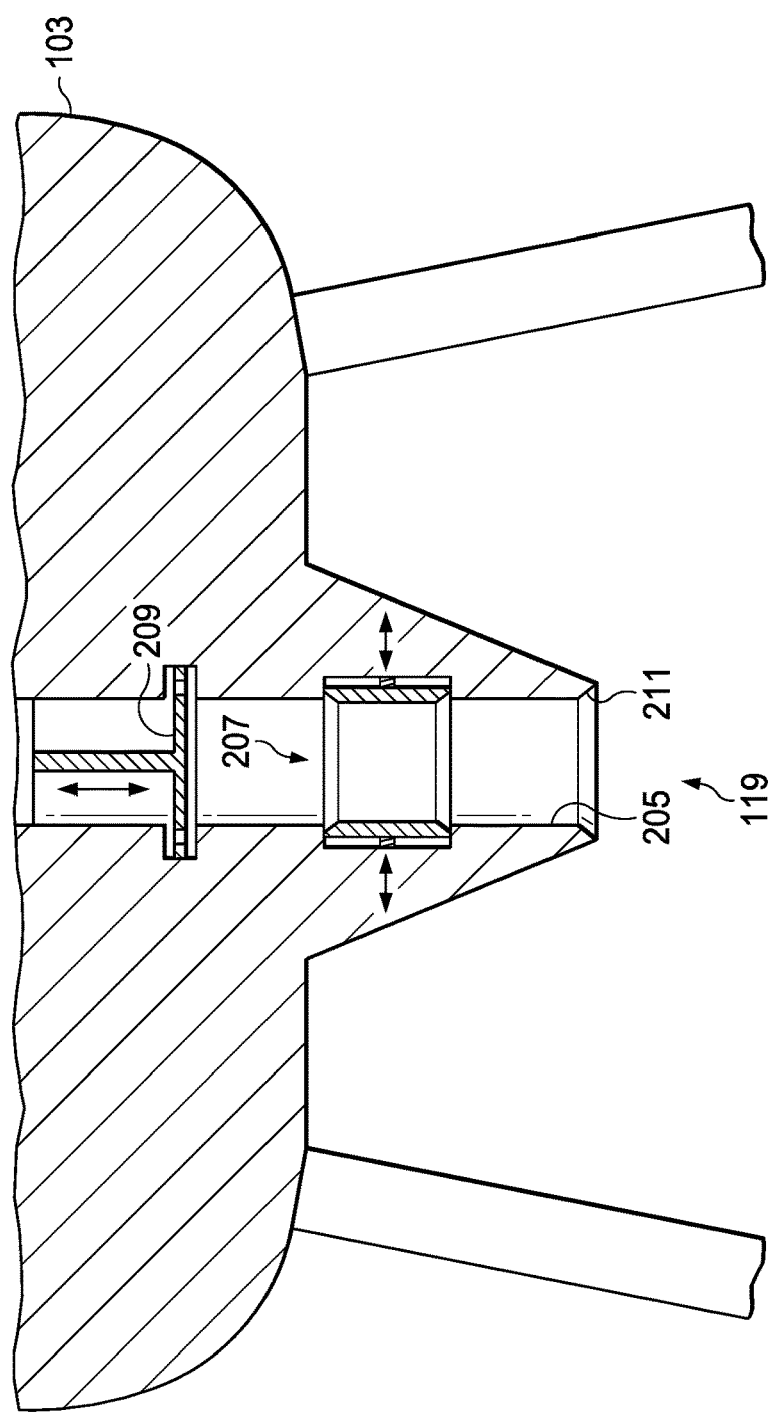
FIG. 2 is a partial section view of a rotorcraft according to this disclosure.

FIG. 2 illustrates aircraft 103 equipped with the recessed receptacle 119 according to this disclosure. Recessed receptacle 119 is centrally located on an underside of aircraft 103. Recessed receptacle 119 is configured to accept fuel from an autonomous refueling system by being able to be coupled to the refueling arm 117. As illustrated, the recessed receptacle 119 comprises a conduit 205 that is in fluid communication with a fuel tank (not shown) on the aircraft 103, a clamping system 207, a check valve 209, and a beveled edge 211.

The clamping system 207 is configured to allow the aircraft 103 to clamp onto a nozzle 117A of the refueling arm 117. In the preferred embodiment, the clamping system 207 is remotely actuated by the aircraft 103 electronically. Alternatively, the clamping system 207 is purely mechanical and engages and disengages based upon the force applied by the aircraft 103 onto the refueling arm 117. In use, the aircraft 103 approaches the refueling arm 117 and lands such that the nozzle 117A of the refueling arm 117 is inserted into the recessed receptacle 119. The aircraft 103 then activates the clamping system 207 and applies a force to the nozzle 117A of the refueling arm 117. Once refueling is complete, the clamping system 207 disengages and the aircraft 103 can decouple from the refueling arm 117 and take off. While the clamping system 207 is illustrated on the aircraft 103, alternatively the clamping system 207 can be located on the refueling arm 117 and apply a force to the aircraft's recessed receptacle 119.

Check valve 209 is located between the clamping system 207 and the fuel tank on the aircraft 103. Typically check valve 209 is selected to actuate based upon a pressure of hydrogen at 5 k psi. Other values of check valves are contemplated as determined by a pressure of the hydrogen storage tank, the rotorcraft's requirements, and other considerations. Once the aircraft 103 has coupled the recessed receptacle 119 to the nozzle 117A of the refueling arm 117 hydrogen gas can then flow towards the check valve 209. The check valve 209 will only move if the pressure of the hydrogen gas is at least 5 k psi to ensure only high-pressure hydrogen is accepted. Furthermore, the check valve 209 can release pressure from the aircraft 103 if a set amount of pressure occurs in the aircraft 103, for example to defuel the aircraft 103.

Figure 3:
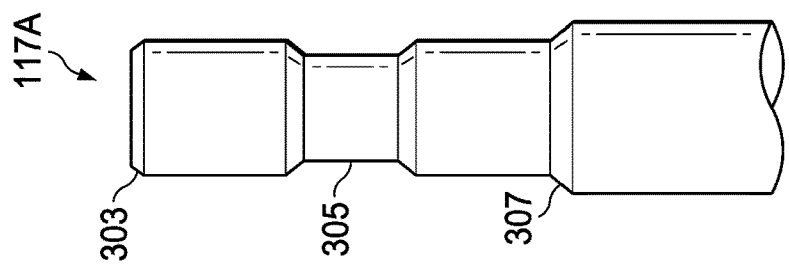
FIG. 3 is a partial side view of a refueling arm nozzle according to this disclosure.

FIG. 3 illustrates a nozzle 117A of a refueling arm 117 according to this disclosure. Nozzle 117A is located on a tip of the refueling arm 117 and is an end of a conduit that originates at a hydrogen storage tank 109. Nozzle 117A is configured to mate with the recessed receptacle 119 and comprises a beveled edge 303, a circular recess 305, and a flare 307. Beveled edge 303 facilitates alignment between the aircraft 103 and the refueling arm 117. Circular recess 305 is configured to receive clamping forces from a clamping system such as clamping system 207. Flare 307 mates with a beveled edge of the recessed receptacle 119 such as beveled edge 211. While the system is illustrated as nozzle 117A being carried by the refueling arm 117, it should be apparent that the nozzle 117A can be carried by the aircraft 103 in place of the recessed receptacle 119.

Figure 4:
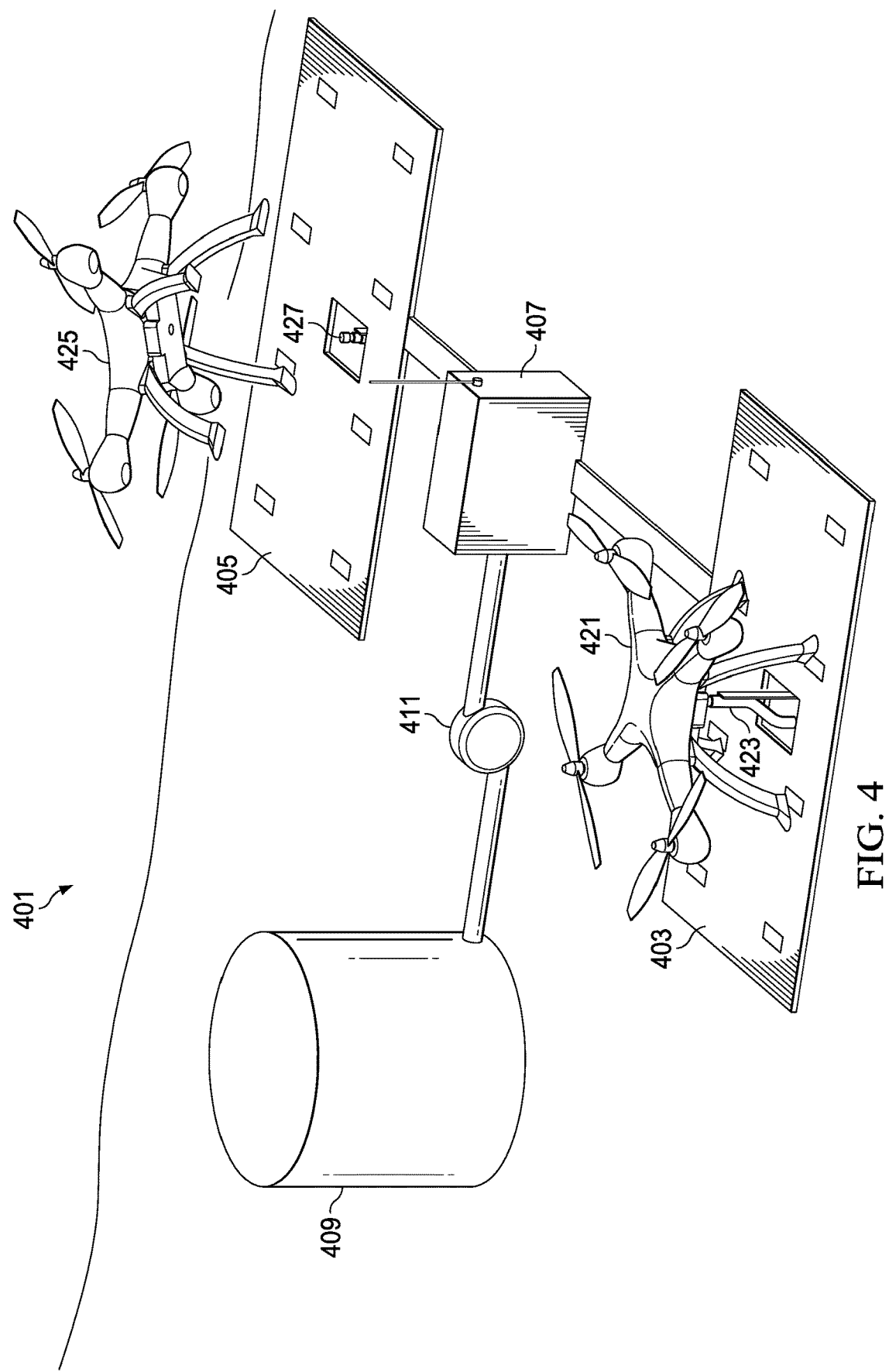
FIG. 4 is an oblique view of another autonomous hydrogen refueling system according to this disclosure.

FIG. 4 illustrates a distributed autonomous hydrogen refueling system 401 according to this disclosure. The distributed autonomous hydrogen refueling system 401 comprises a first landing pad 403, a second landing pad 405, a controller 407, a hydrogen storage tank 409, and a compressor 411. First aircraft 421 is coupled to a first refueling arm 423 of the first landing pad 403. Second aircraft 425 is attempting to couple to a second refueling arm 427 of the second landing pad 405. The second refueling arm 427, as illustrated, is recessed into the second landing pad 405 until the second aircraft 425 has completed its landing. Once the second aircraft 425 has completed its landing, then the second refueling arm 427 can be extended and coupled to the second aircraft 425.

Controller 407 remotely communicates with both aircraft 421, 425 and independently controls a flow of hydrogen fuel from the hydrogen storage tank 409 to each aircraft. Data such as connection status, amount of hydrogen stored in the hydrogen storage tank, and amount of time spent filling each aircraft is transmitted between the aircrafts 421, 425 and the controller 407. In some embodiments the first landing pad 403 can be a 5 k psi-based system and the second landing pad 405 can be a 10 k psi-based system selectively pressurized from the compressor 411. Alternatively, all the landing pads utilize fuel pressurized at the same level.

Figure 5:
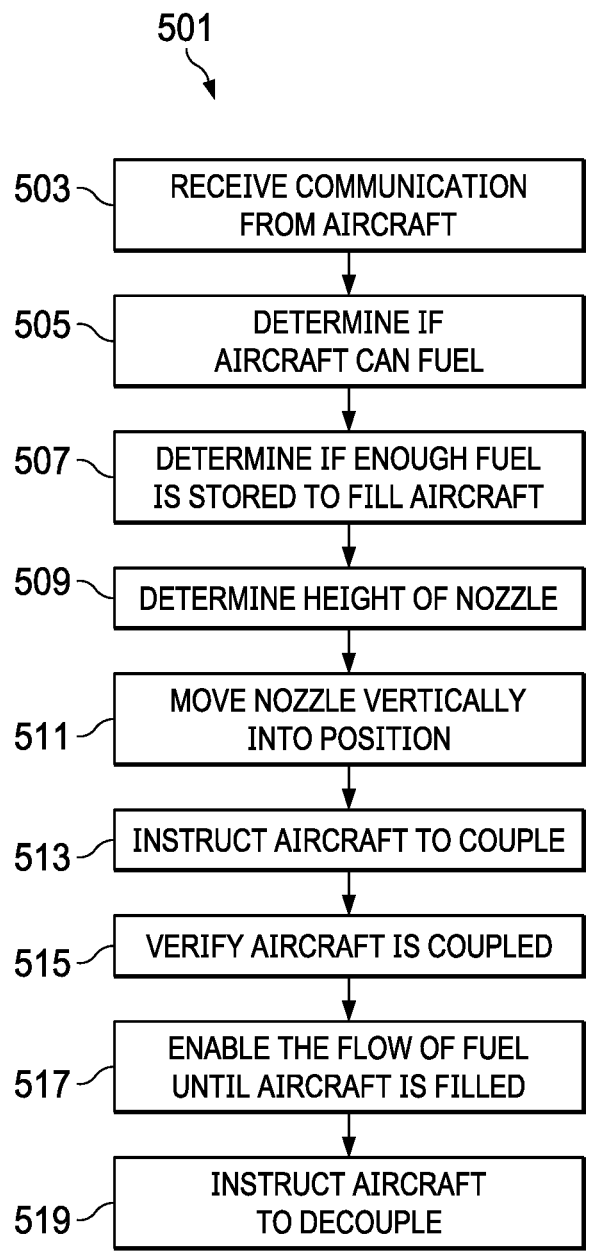
FIG. 5 is a diagram of a method of autonomous hydrogen refueling according to this disclosure.

FIG. 5 illustrates a method 501 of autonomous hydrogen refueling according to this disclosure. Initially, at block 503 the autonomous refueling system receives a communication from the aircraft 103 relaying the aircraft's need for hydrogen fuel. Next, at block 505 the system determines if the aircraft 103 can fuel. For example, the system determines if the aircraft's recessed receptacle 119 is capable of coupling to the refueling arm 117. Then, at block 507 the system determines if the hydrogen storage tank 109 contains enough hydrogen fuel to adequately refill the aircraft 103. Once the system has determined enough fuel is stored, then at block 509 the system determines a required height of the nozzle 117A. The aircraft provides identifying information to the system to enable the system to determine a height of the nozzle 117A. Once a height is calculated the system at block 511 actuates the actuator 121 moving the refueling arm 117 to the proper position for coupling. The system then at block 513 instructs the aircraft 103 to land and couple to the nozzle 117A of the refueling arm 117. In the preferred embodiment, the aircraft 103 clamps to the nozzle 117A of the refueling arm 117. The system then performs a verification that the aircraft 103 has properly coupled 515. Once the verification was performed, then at block 517 the system enables the flow of fuel until the aircraft 103 is refueled. After the aircraft 103 is refueled, then at block 519 the system instructs the aircraft 103 to decouple and take-off.

Figure 6:
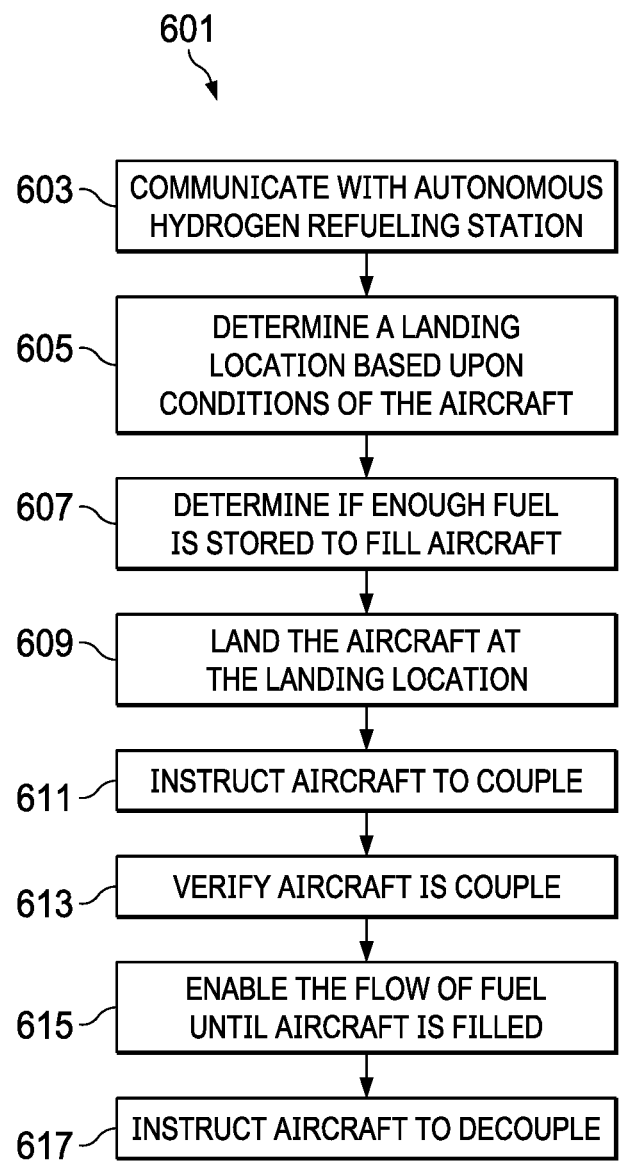
FIG. 6 is a diagram of another method of autonomous hydrogen refueling according to this disclosure.

FIG. 6 illustrates another method of autonomous hydrogen refueling 601 according to this disclosure. First, at block 603 communications occur between the aircraft 103 and the autonomous hydrogen refueling station 101. For example, the aircraft 103 can send a signal out looking for fuel and the landing pad 105 could reply with a fuel available signal. Second, at block 605 the system determines where on which pad the aircraft 103 should land. For example, one pad could be out of service or busy. Then, at block 607 a determination is made whether enough of the proper fuel is stored to adequately refuel the aircraft 103. If the aircraft 103 can be refueled then, at block 609 the aircraft lands upon the selected landing pad 105. Next, at block 611 the aircraft 103 is instructed to couple to the nozzle 117A of the refueling arm 117, then at block 613 the coupling is verified. For example, pressure sensors can be used to determine a closed fuel system. Next, at block 615 fuel flow is enabled until the aircraft 103 is refueled. Finally, the aircraft 103 is instructed to decouple at block 617.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_1$, and an upper limit, $R_u$, is disclosed, any number falling within the range is specifically disclosed. In particular, the following numbers within the range are specifically disclosed: $R=R_1+k*(R_u-R_1)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A system for autonomous hydrogen refueling of an aircraft, comprising:
   a stationary landing pad having a substantially planar landing surface;
   a hydrogen storage tank;
   a refueling arm at least partially disposed below the landing pad configured to couple the hydrogen storage tank to the aircraft;
   a controller configured to control a flow of fuel from the hydrogen storage tank to the aircraft; and
   an actuator located between the landing pad and the refueling arm;
   wherein the refueling arm translates vertically to a position vertically higher than the landing surface in response to the controller;
   wherein while aircraft is supported by the landing surface, the aircraft can be coupled to the refueling arm without respect to an angular orientation of the aircraft relative to the refueling arm as viewed from above.

2. The system of claim 1, further comprising:
   a compressor located between the hydrogen storage tank and the controller;
   wherein the compressor is configured to increase a pressure of the fuel from the hydrogen storage tank.

3. The system of claim 1, further comprising:
   at least one sensor located on the landing pad;
   wherein the at least one sensor is configured to detect a proximity of the aircraft relative to the landing pad.

4. The system of claim 1, further comprising:
   a wireless system coupled to the controller;
   wherein the wireless system is configured to relay fueling data between the controller and the aircraft.

5. The system of claim 1, further comprising:
   a recessed receptacle located on an underside surface of the aircraft.

6. The system of claim 5, wherein the recessed receptacle clamps onto the refueling arm.

7. The system of claim 5, wherein the refueling arm clamps onto the recessed receptacle.

8. A method for autonomous refueling of an aircraft comprising:
   providing a refueling arm having a nozzle, fuel flow through the nozzle being controlled by a controller located local to the refueling arm;
   conducting wireless communication between the aircraft and the controller to verifying whether enough fuel is stored before landing the aircraft on the nozzle;
   when there is enough fuel stored, landing the aircraft on the nozzle;
   coupling the nozzle to the aircraft without respect to an angular orientation of the aircraft relative to the nozzle as viewed from above;
   flowing fuel to the aircraft through the refueling arm; and
   decoupling the nozzle from the aircraft;
   wherein the refueling arm is associated with a stationary landing pad.

9. The method of claim 8, further comprising:
   determining a height of the nozzle based upon a communication from the aircraft.

10. The method of claim 9, further comprising:
    adjusting the height of the nozzle based upon the communication from the aircraft.

11. The method of claim 8, further comprising:
    verifying the aircraft is coupled before flowing fuel to the aircraft.

12. A system for autonomous hydrogen refueling of a plurality of aircraft concurrently, comprising:
    a hydrogen storage tank;
    a first landing pad having a substantially planar landing surface;
    a first refueling arm located on the first landing pad configured to couple the hydrogen storage tank to a first aircraft;
    a second landing pad;
    a second refueling arm located on the second landing pad configured to couple the hydrogen storage tank to a second aircraft; and
    a controller located substantially local to at least one of the first landing pad and the second landing pad configured to control a flow of fuel from the hydrogen storage tank to each refueling arm independently;
    wherein the controller is further configured to wirelessly communicate with the first aircraft and the second aircraft to determine whether enough fuel is stored before landing the first aircraft and the second aircraft, respectively; and
    wherein the first landing pad is stationary, an actuator is located between the first landing pad and the first refueling arm, and wherein the first refueling arm translates vertically to a position vertically higher than the landing surface in response to the controller; and
    wherein while the first aircraft is supported by the landing surface, the first aircraft can be coupled to the first refueling arm without respect to an angular orientation of the first aircraft relative to the first refueling arm as viewed from above.

13. The system of claim 12, further comprising:
    a compressor located between the hydrogen storage tank and the controller;
    wherein the compressor is configured to increase a pressure of the fuel from the hydrogen storage tank.

14. The system of claim 12, further comprising:
    a plurality of sensors located on the first landing pad;
    wherein the plurality of sensors are configured to detect a proximity of the first aircraft relative to the first landing pad.

15. The system of claim 12, further comprising:
    a recessed receptacle located on an underside surface of the first aircraft.

16. The system of claim 12, wherein a recessed receptacle clamps onto the first refueling arm.

17. The system of claim 12, further comprising:
    a wireless system coupled to the controller;

wherein the wireless system is configured to relay fueling data between the controller, the first aircraft, and the second aircraft.

* * * * *